3,287,453
AMINOPYRIMIDINE PHOSPHATE AND
THIOPHOSPHATE DERIVATIVES
Gordon Victor McHattie, Macclesfield, England, assignor to Imperial Chemical Industries Limited, London, England, a corporation of Great Britain
No Drawing. Filed Mar. 19, 1964, Ser. No. 353,242
Claims priority, application Great Britain, Mar. 28, 1963, 12,338/63
6 Claims. (Cl. 260—256.5)

This invention relates to heterocyclic derivatives and more particularly it relates to pyrimidine derivatives which are useful in that some of them possess insecticidal properties and some of them possess fungicidal properties.

According to the invention we provide pyrimidine derivatives of the formula:

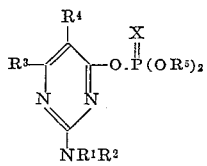

wherein $R^1$, $R^2$ and $R^5$, which may be the same or different, stand for alkyl or alkenyl radicals of not more than 6 carbon atoms, or wherein $R^1$ and $R^2$ together with the adjacent nitrogen atom form a heterocyclic radical, wherein $R^3$ and $R^4$ stand for hydrogen or alkyl or alkenyl radicals of not more than 6 carbon atoms, and wherein X stands for the oxygen or sulphur atom.

As a suitable value for $R^1$, $R^2$ or $R^5$, or for $R^3$ or $R^4$ when they stand for alkyl or alkenyl radicals of not more than 6 carbon atoms, there may be mentioned, for example, a methyl, ethyl, propyl, butyl or allyl radicals. As a suitable value for the group —$NR^1R^2$ when it stands for a heterocyclic radical, there may be mentioned, for example, a heterocyclic radical containing a 5- or 6-membered ring, for example, the piperidino radical.

Specific pyrimidine derivatives of the invention are, for example,

O,O-diethyl O-(2-dimethylamino-4-methylpyrimid-6-yl)phosphorothionate,
O,O di-n-butyl-O-(2-dimethylamino-4-methylpyrimid-6-yl)phosphorothionate,
O,O-diethyl-O-(2-dimethylamino-4-methylpyrimid-6-yl)-phosphate,
O,O-diethyl-O-(4-n-butyl-2-dimethylaminopyrimid-6-yl)-phosphorothionate,
O,O-diethyl-O-(2-di-n-butylamino-4-methylpyrimid-6-yl)phosphorothionate,
O,O-diethyl-O-(2-dimethylaminopyrimid-6-yl)phosphorothionate,
O,O-diethyl-O-(5-n-butyl-2-dimethylamino-4-methylpyrimid-6-yl)phosphorothionate,
O,O-diethyl-O-(4-methyl-2-piperidinopyrimid-6-yl)phosphorothionate and
O,O-dimethyl-O-(5-allyl-2-dimethylamino-4-methylpyrimid-6-yl)phosphorothionate.

According to a further feature of the invention we provide a process for the manufacture of the said pyrimidine derivatives which comprises the interaction of a compound of the formula:

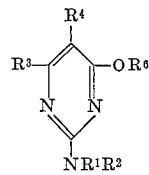

wherein $R^1$, $R^2$, $R^3$ and $R^4$ have the meanings stated above, and wherein $R^6$ stands for hydrogen or an alkali metal atom, with a halogeno derivative of the formula:

wherein $R^5$ and X have the meanings stated above, and wherein Y stands for a halogen atom.

As a suitable value for $R^6$ when it stands for an alkali metal atom there may be mentioned, for example, the sodium or potassium atom. As a suitable value for Y there may be mentioned, for example, the chlorine or bromine atom.

In the case where $R^6$ stands for hydrogen the interaction is conveniently carried out in the presence of an acid-binding agent, for example an alkali metal salt of a weak acid, for example an alkali metal carbonate, for example potassium carbonate, or a tertiary organic base, for example a trialkylamine of not more than 12 carbon atoms, for example triethylamine, or an N,N-dialkylarylamine, for example an N,N-dialkylarylamine of not more than 12 carbon atoms, for example N,N-dimethylaniline.

The interaction may conveniently be carried out in an inert diluent or solvent, for example benzene, and it may be accelerated or completed by the application of heat. The reaction may optionally be carried out in the presence of a catalyst which may be selected from the group consisting of mercurous chloride, mercuric chloride, mercurous iodide, mercuric iodide and cupric chloride.

As stated above, some of the pyrimidine derivatives of the invention possess useful insecticidal properties and some of them possess useful fungicidal properties. Thus, for example, O:O-diethyl-O-(5-n-butyl-2-dimethylamino-4-methylpyrimid-6-yl)phosphorothionate possesses valuable fungicidal properties and it is effective against powdery mildew of cucumber. Furthermore, for example, O:O-diethyl-O-(2-dimethylamino-4-methylpyrimid-6-yl)-phosphorothionate,
O:O-diethyl-O-(2-dimethylamino-4-methylpyrimid-6-yl)phosphate,
O:O-diethyl-O-(4-n-butyl-2-dimethylaminopyrimid-6-yl)phosphorothionate and
O:O-diethyl-O-(2-dimethylaminopyrimid-6-yl)phosphorothionate possess valuable insecticidal properties and they are effective against the Australian sheep blowfly *Lucilia cuprina*, against the Australian cattle tick and also against the insect pests known as black aphid (*Aphis fabae*), green aphid (*Macrosiphum pisi*), red spider mites (*Tetranychus telarius*) and their eggs, mosquito larvae (*Aëdos aegypti*), cotton stainer capsid (*Dysdercus fasciatus*), diamond back moth caterpillar (*Plutella maculipennis*), mustard beetle (*Phaedon cochleariae*) and grain weevil (*Calandra granaria*).

According to a further feature of the invention therefore, we provide insecticidal and fungicidal compositions comprising one or more of the said pyrimidine derivatives in admixture with a diluent or carrier therefor.

The compositions may be used for agricultural, horticultural or veterinary purposes and the type of composition used in any instance will depend upon the particular purpose for which it is to be used.

The compositions may be in the form of dusting powders wherein the active ingredient is mixed with a solid diluent or carrier. Suitable solid diluents or carriers may be, for example, kaolin, bentonite, kieselguhr, dolomite, calcium carbonate, talc, powered magnesia, fuller's earth, gypsum, Hewitt's earth, diatomaceous earth and china clay.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic or non-ionic type. Suitable agents of the cationic type include, for example, quaternary ammonium compounds, for example, cetyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecylbenzenesulphonate, sodium, calcium or ammonium lignosulphonate, butyl-naphthalene sulphonate, and a mixture of the sodium salts of diisopropyl—and triisopropyl—naphthalene sulphonic acids. Suitable agents of the non-ionic type include, for example, the condensation products of ethylene oxide with fatty alcohols such as oleyl alchohol or cetyl alcohol, or with alkyl phenols such as octylphenol, nonylphenol and octylcresol. Other non-ionic agents are the partial esters derived from long chain fatty acids and hexitol anhydrides, the condensation products of the said partial esters with ethylene oxide, and the lecithins. Suitable suspending agents are, for example, hydrophilic colloids, for example polyvinylpyrrolidone and sodium carboxymethylcellulose, and the vegetable gums, for example gum acacia and gum tragacanth.

The aqueous dispersions or emulsions may be prepared by dissolving the active ingredient or ingredients in an organic solvent which may contain one more wetting, dispersing or emulsifying agents and then adding the mixture so obtained to water which may likewise contain one or more wetting, dispersing or emulsifying agents. Suitable organic solvents are isopropyl alcohol, propylene glycol, diacetone alcohol, toluene, kerosene, methylnapthalene, xylenes and trichloroethylene.

The compositions to be used as sprays may also be in the form of aerosols wherein the formulation is held in a container under pressure in the presence of a propellant such as fluorotrichloromethane or dichlorodifluoromethane.

By the inclusion of suitable additives for example for improving the distribution, adhesive power and resistance to rain on treated surfaces, the different compositions can be better adapted for the various uses for which they are intended.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used.

For agricultural or horticultural purposes, an aqueous preparation containing between 0.001% and 0.1% by weight of active ingredient or ingredients may be used.

When used for veterinary purposes, the compositions may be in the form of dips, sprays or dusting powders for external application and the compositions described above are suitable for this purpose. The veterinary compositions for external use may also be in the form of a hand dressing prepared from an ointment or cream base for example white petroleum jelly.

Alternatively, the veterinary compositions of the invention may be in a form suitable for oral administration, for example as tablets, capsules, boluses, suspensions, emulsions or solutions. The compositions for oral administration may contain conventional excipients, for example inert carriers, for example calcium phosphate, lubricating agents, for example, magnesium stearate, and granulating and disintegrating agents conventionally used in tablet manufacture, for example, starch and/or vegetable gums. The suspensions and emulsions may be prepared using conventional excipients described above.

Alternatively, the veterinary compositions of the invention may be in a form suitable for parenteral administration, for example sterile solutions, suspensions or emulsions. The compositions for parenteral administration may contain conventional excipients, for example solvents, for example water, vegetable oils, or N,N-dimethylacetamide, and excipients described above conventionally used in the prepartion of emulsions and suspensions.

The veterinary compositions of the invention may optionally additionally contain one or more substances of known veterinary utility, for example anthelmintics and/or bactericides. The veterinary compositions of the invention may in addition be stabilised by the incorporation therein of stabilising agents, for example epoxides, for example epichlorohydrin.

The invention is illustrated but not limited by the following examples in which the parts are by weight:

*Example 1*

A mixture of 76 parts of 2-dimethylamino-4-methyl-6-hydroxypirimidine, 69 parts of potassium carbonate and 87 parts of benzene is heated under reflux for 3 hours. Water is removed from the mixture by azeotropic distillation, and the volume of the mixture is restored to the original volume by the addition of benzene. There are then added 94 parts of O,O- diethyl phosphorochloridothionate, and the mixture is heated under reflux for 11 hours. The mixture is cooled, washed successively with a 5% aqueous solution of potassium carbonate and with water, and then dried. The solvent is removed by distillation under reduced pressure and the residue is fractionally distilled under reduced pressure. There is thus obtained O,O-diethyl O - (2 - dimethylamino-4-methylpyrimid-6-yl)phosphorothionate, B.P. 128–132° C./0.04 mm.

*Example 2*

A mixture of 51 parts of 2-dimethylamino-4-methyl-6-hydroxypyrimidine, 34 parts of triethylamine, 435 parts of benzene and 63 parts of O,O-diethyl phosphorochloridothionate is heated under reflux for 11 hours. The mixture is cooled, washed successively with 100 parts of water, 50 parts of 2 N-hydrochloric acid, and 100 parts of water, and then dried. The solution thus obtained is evaporated and the residue is fractionally distilled under reduced pressure. There is thus obtained o,o-diethyl o- (2 - dimethylamino-4-methylpyrimid-6-yl)phosphorothionate, B.P. 128–132° C./0.04 mm.

Example 3

A mixture of 76 parts of 2-dimethylamino-4-methyl-6-hydroxypyrimidine, 53 parts of sodium carbonate and 87 parts of benzene is heated under reflux for 3 hours. Water is removed from the mixture by azeotropic distillation and the volume of the mixture is restored by the addition of dry benzene. There are then added 94 parts of O,O-diethylphosphorochloridothionate, and the reaction mixture is heated under reflux for 3 hours. Isolation is effected by the procedure as described in Example 1, and there is thus obtained O,O-diethyl-O-(2-dimethylamino-4-methylpyrimid - 6 - yl)phosphorothionate, B.P. 128–132° C./0.04 mm.

Example 4

A stirred mixture of 20 parts of 2-dimethylamino-4-methyl-6-hydroxypyrimidine, 18 parts of potassium carbonate and 158 parts of benzene is heated under reflux for 3 hours. Water is removed by azeotropic distillation and the volume of the mixture is restored by the addition of benzene. There are then added 25 parts of O,O-di-n-butyl phosphorochloridothionate, and the reaction mixture is heated under reflux for 30 hours. The mixture is then cooled, washed successively with 30 parts of water, 30 parts of a 5% aqueous solution of potassium carbonate, and 40 parts of water, and then dried. The solvent is removed by distillation under reduced pressure, and the residual oil is fractionated under reduced pressure. There is thus obtained O,O-di-n-butyl-O-(2-dimethylamino-4-methylpyrimid - 6 - yl)phosphorothionate, B.P. 160–164° C./0.3 mm.

Example 5

A stirred mixture of 10 parts of 2-dimethylamino-4-methyl-6-hydroxypyrimidine, 9 parts of potassium carbonate and 105 parts of benzene is heated under reflux for 3 hours. Water is removed by azeotropic distillation and the volume of the mixture is restored by addition of benzene. There are then added 9 parts of O,O-diethyl phosphorochloridate, and the reaction mixture is heated under reflux for 30 hours. The mixture is cooled, washed successively with 20 parts of water, 30 parts of a 5% aqueous solution of potassium carbonate, and 20 parts of water, and then dried. The solvent is then removed by distillation under reduced pressure. The residue is triturated with 40 parts of petroleum ether (B.P. 40–60° C.), the mixture is filtered and the solvent removed by distillation. There is thus obtained O,O-diethyl-O-(2-dimethylamino-4-methylpyrimid-6-yl)phosphate.

Example 6

A stirred mixture of 20 parts of 4-n-butyl-2-dimethylamino-6-hydroxypyrimidine, 15 parts of potassium carbonate and 264 parts of benzene is heated under reflux for 3 hours. Water is removed by azeotropic distillation and the original volume is then restored by the addition of benzene. There are then added 16 parts of O,O diethyl phosphorochloridothionate and the reaction mixture is then heated under reflux for 30 hours. The mixture is then cooled, washed successively with 50 parts of water, 50 parts of a 5% aqueous solution of potassium carbonate, and 50 parts of water, and dried. The benzene is then distilled under reduced pressure and the residue is heated to an internal temperature of 100° C. in vacuo for a short time and volatile products allowed to distil. There is thus obtained O,O-diethyl-O-(4-n-butyl-2-dimethylaminopyrimid-6-yl) - phosphorothionate as an oil.

Example 7

A mixture of 23 parts of 2-di-n-butylamino-4-hydroxy-6-methylpyrimidine, 13.8 parts of potassium carbonate and 220 parts of benzene is stirred and heated under reflux for 3 hours. Water is removed by azeotropic distillation and the volume of the mixture is restored by the addition of dry benzene. 18.8 parts of O,O-diethyl phosphorochloridothionate are then added and the reaction mixture is stirred under reflux for 18 hours. The mixture is cooled and filtered. The filtrate is washed successively with 30 parts of a 5% aqueous solution of potassium carbonate and 30 parts of water. The benzene solution is dried and the solvent evaporated. There is thus obtained O,O - diethyl - O-(2 - di - n-butylamino-4-methylpyrimid-6-yl)phosphorothionate.

Example 8

A mixture of 10.6 parts of 2-dimethylamino-4-hydroxy pyrimidine, 11.5 parts of potassium carbonate and 200 parts of benzene is stirred and heated under reflux for 3 hours. Water is removed by azeotropic distillation and the volume of the mixture restored by the addition of dry benzene. 18.3 parts of O,O - diethyl phosphorochloridothionate are then added and the reaction mixture is stirred under reflux for 18 hours. The mixture is then cooled and filtered. The filtrate is washed successively with 30 parts of an aqueous solution of potassium carbonate and 30 parts of water. The benzene solution is dried and the benzene is removed by evaporation. There is thus obtained O,O-diethyl-O-(2-dimethylaminopyrimid-6-yl)phosphorothioanate.

Example 9

A mixture of 18.5 parts of 5-n-butyl-2-dimethylamino-4-hydroxy-6-methylpyrimidine, 12.2 parts of potassium carbonate and 200 parts of benzene is stirred and heated under reflux for 3 hours. Water is removed by azeotropic distillation and the volume of the mixture restored by the addition of dry benzene. 16.7 parts of O,O-diethyl phosphorochloridothionate are added and the reaction mixture is stirred under reflux for 24 hours. The mixture is cooled and filtered. The filtrate is washed successively with 30 parts of a 5% aqueous solution of sodium carbonate and 30 parts of water. The benzene solution is dried and the solvent is removed by evaporation. There is thus obtained O,O-diethyl-O-(5-n-butyl-2 - dimethylamino - 4 - methylpyrimid-6-yl)phosphorothionate.

The 5 - n-butyl-2-dimethylamino-4-hydroxy-6-methylpyrimidine used as starting material may be prepared by adding a solution of 4 parts of sodium hydroxide in 40 parts of water to a stirred suspension of 13.6 parts of dimethylguanidine sulphate in 20.4 parts of ethyl α-n-butylacetoacetate and 100 parts of ethanol. The mixture is stirred and heated under reflux for 8 hours. The solvent is removed by distillation in vacuo and the residue is extracted with ethylacetate. The ethyl acetate solution is dried and the solvent removed by evaporation. The residue is crystallised from ethanol and there is thus obtained 5 - n - butyl-2-dimethylamino-4-hydroxy-6-methyl pyrimidine, M.P. 103° C.

Example 10

A mixture of 8 parts of 4-hydroxy-6-methyl-2-piperidinopyrimidine, 5.7 parts of potassium carbonate and 100 parts of toluene is stirred and heated under reflux for 3 hours. Water is removed by azeotropic distillation and the volume of the mixture is restored by the addition of dry toluene. 8 parts of O,O-diethyl phosphorochloridothionate are added and the reaction mixture is stirred under reflux for 24 hours. The mixture is cooled and filtered. The filtrate is washed successively with 20 parts of a 5% aqueous solution of potassium carbonate and 20 parts of water. The benzene solution is then dried, the solvent is removed by evaporation and there is thus obtained O,O-diethyl-O-(4 - methyl-2 - piperidinopyrimid-6-yl)phosphorothionate.

Example 11

A mixture of 18 parts of 5-allyl-2-dimethylamino-4-hydroxy-6-methylpyrimidine, 12 parts of potassium carbonate and 200 parts of toluene is stirred and heated under reflux for 3 hours. Water is removed by azeotropic distillation and the volume of the solution is restored by addition of dry toluene. 15 parts of O,O-dimethyl phosphorochloridothionate are added and the reaction mixture is stirred and heated under reflux for 24 hours. The reaction mixture is cooled and filtered and the filtrate is washed successively with 30 parts of 5% aqueous sodium carbonate solution and 30 parts of water. The toluene solution is dried and toluene is removed by distillation. Other volatile products are removed by distillation in vacuo to an internal temperature of 100° C. There is thus obtained O,O-dimethyl-O-(5-allyl-2-dimethylamino-4-methylpyrimid-6-yl)phosphorothionate as a pale straw-coloured oil.

*Example 12*

3 parts of O,O-diethyl-O-(2-dimethylamino-4-methylpyrimid-6-yl)phosphorothionate, 7 parts of kieselguhr and 90 parts of dolomite are mixed together and ground in a suitable mill until the average particle size is below 10 microns. There is thus obtained a dusting powder suitable for topical application to domestic animals for the treatment of parasitic infestations or for use in agricultural applications.

*Example 13*

25 parts of O,O-diethyl-O-(2-dimethylamino-4-methylpyrimid-6-yl)phosphorothionate, 60 parts of fuller's earth, 10 parts of diatomaceous earth, 1 part of oleyl-amidomethyl laurate and 4 parts of sodium lignin sulphonate are mechanically mixed and ground in a suitable grinding machine until the average particle size is less than 20 microns. There is thus obtained a dispersible powder which may be added to water to produce a suspension suitable for spraying or dipping of domestic animals for the treatment of parasitic infestations or for use in agricultural applications.

*Example 14*

25 parts of O,O-diethyl-O-(2-dimethylamino-4-methylpyrimid-6-yl)phosphorothionate, 65 parts of xylene and 10 parts of an alkyl aryl polyether alcohol (Triton X–100) are mixed in a suitable mixer. There is thus obtained an emulsion concentrate which may be added to water to produce an emulsion suitable for spraying domestic animals for the treatment of parasitic infestations or for use in agricultural applications.

*Example 15*

A mixture of 40 parts of white beeswax, 60 parts of hard paraffin, 100 parts of cetostearyl alcohol and 1800 parts of white soft paraffin heated at 60° C. is gradually incorporated with 1 part of O,O-diethyl-O-(2-dimethylamino-4-methylpyrimid - 6 - yl)phosphorothionate. The mixture is stirred until complete mixing is obtained and allowed to cool. There is thus obtained an ointment suitable for application to domestic animals for the treatment of parasitic infestations.

*Example 16*

A solution of 1 part of O,O-diethyl-O-(2-dimethylamino-4-methylpyrimid - 6 - yl)phosphorothionate in 99 parts of cyclohexanone is cooled to —40° C. and mixed with 900 parts of dichlorodifluoromethane at the same temperature. The resultant solution is filled into suitable containers and there is thus obtained an aerosol spray suitable for application to domestic animals for the treatment of parasitic infestations or for use as an insecticidal spray.

*Example 17*

20 parts of O,O-diethyl-O-(2-dimethylamino-4-methylpyrimid-6-yl)phosphorothionate are mixed with 80 parts of arachis oil. There is thus obtained an oily solution suitable for oral administration to domestic animals for the treatment of parasitic infestations.

*Example 18*

5 parts of O,O-diethyl-O-(4-n-butyl-2-dimethylamino-pyrimid-6-yl)phosphorothionate and 95 parts of talc are mixed together until the active ingredient is uniformly distributed throughout the mixture. There is thus obtained a dusting powder suitable for use as an insecticidal powder.

The active ingredient is replaced by 5 parts of O,O-diethyl-O-(2-dimethylamino-4-methylpyrimid - 6 - yl)phosphorothionate or O,O - diethyl-O-(2 - dimethylaminopyrimid-6-yl)phosphorothionate and there are likewise obtained dusting powders suitable for use as insecticidal powders.

*Example 19*

A mixture of 10 parts of O,O-diethyl-O-(2-dimethyl-aminopyrimid-6-yl)phosphorothionate, 10 parts of an ethylene oxide/nonylphenol condensate (used as a wetting agent) and 80 parts of diacetone alcohol gives a concentrate which can be added to water, with stirring, and there is thus obtained an aqueous dispersion suitable for application as a spray in the control of insect pests.

The active ingredient is replaced by 10 parts of O,O-diethyl-O-(4-n-butyl - 2 - dimethylaminopyrimid - 6 - yl)-phosphorothionate or O,O-diethyl-O-(2-dimethylamino-4-methylpyrimid-6-yl)phosphate and there are likewise obtained aqueous dispersions suitable for application as sprays in the control of insect pests.

*Example 20*

1 part of O,O-diethyl-O-(5-n-butyl-2-dimethylamino-4-methylpyrimid-6-yl)phosphorothionate is dissolved in 100 parts of diacetone alcohol and the solution so obtained is diluted with water containing a condensation product (used as a wetting agent) formed from octylcresol and 8 molecular proportions of ethylene oxide. The aqueous dispersions so obtained contain respectively 0.01% and 0.033% by weight of the active ingredient and are tested for activity in the control of powdery mildew of cucumbers as follows:

Young cucumber plants are sprayed with the aqueous dispersions containing respectively 0.01 and 0.033% by weight of active ingredient. The plants are then dried by allowing them to stand for about 18 hours and they are then inoculated by dusting them with the spores of the fungus which causes mildew disease. After 8 days, virtually no disease has developed on the treated plants whereas untreated plants used for control purposes which have not been sprayed are almost completely covered with mildew.

*Example 21*

This example illustrates the activity of several of the compounds against a variety of insect pests. In each case the test liquid is an aqueous dispersion obtained according to the method described in Example 20. The insects used in the tests are either supported on host plants or a suitable medium such as food. The tests are carried out using aqueous dispersions containing respectively 0.05% or 0.0125% by weight of each compound except in the tests with mosquito larvae which are carried out by using an aqueous dispersion containing only 0.01% by weight of each compound because of the much greater activity of the compounds toward the larvae.

The insects are sprayed with the test liquid and mortality counts are made at varying periods afterwards, depending upon the type of test insect used. The longest test period, however, does not extend beyond two days. The results are given in the table below where the activity is expressed in the form of an integer 0–3, the said integer indicating the percentage of insects killed as follows:

| | |
|---|---|
| 0 | Under 30% kill. |
| 1 | 30–49% kill. |
| 2 | 50–90% kill. |
| 3 | Over 90% kill. |

The insects used and represented by letters in the table are as follows:

A.f=*Aphis fabae*
M.p=*Macrosiphum pisi*
T.a=*Tetranychus telarius*
T.e=*Tetranychus telarius* (eggs)
Mos=*Aëdes aegypti*
M=*Musca domestica*
D=*Dysdercus fasciatus*
Pl=*Plutella maculipennis*
Ph=*Phaedon cochleariae*
C=*Calandra granaria*

What I claim is:
1. A pyrimidine derivative of the formula

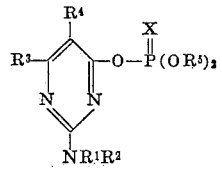

wherein $R^1$, $R^2$ and $R^5$ are selected from alkyl and alkenyl of up to 6 carbon atoms, or wherein the $-NR^1R^2$ group is an alkyleneimino ring of 5 to 6 ring atoms, wherein $R^3$ and $R^4$ are selected from hydrogen and alkyl and alkenyl of up to 6 carbon atoms, and wherein X is selected from oxygen and sulphur.

2. A pyrimidine derivative according to claim 1 wherein $R^1$, $R^2$, $R^3$, $R^4$ and $R^5$ are selected from the group consisting of methyl, ethyl, propyl, butyl and allyl.

3. A pyrimidine derivative according to claim 1 wherein the $-NR^1R^2$ group is piperidino.

| Compound | Percent w./w. | A.f | M.p | T.a | T.e | Mos | M | D | Pl | Ph | C |
|---|---|---|---|---|---|---|---|---|---|---|---|
| $CH_3$-pyrimidine-$OP(OC_2H_5)_2$ (S), $N-(C_4H_9-n)_2$ | 0.01<br>0.05<br>0.0125 | <br>3<br>1 | <br>3<br>2 | <br>3<br>0 | <br>3<br>3 | 3<br><br> | <br>3<br>1 | <br>0<br>0 | <br>2<br>0 | <br>3<br>3 | <br>0<br>0 |
| pyrimidine-$OP(OC_2H_5)_2$ (S), $N(CH_3)_2$ | 0.01<br>0.05<br>0.0125 | <br>3<br>3 | <br>3<br>3 | <br>3<br>3 | <br>3<br>3 | 3<br><br> | <br>3<br>3 | <br>3<br>3 | <br>3<br>3 | <br>3<br>3 | <br>3<br>3 |
| $CH_3$-pyrimidine-$OP(OC_4H_9-n)_2$ (S), $N(CH_3)_2$ | 0.01<br>0.05<br>0.0125 | <br>1<br>0 | <br>0<br>0 | <br>3<br>0 | <br>3<br>2 | 3<br><br> | <br>2<br>0 | <br>0<br>0 | <br>1<br>0 | <br>3<br>1 | <br>0<br>0 |
| $CH_3$-pyrimidine-$OP(OC_2H_5)_2$ (O), $N(CH_3)_2$ | 0.01<br>0.05<br>0.0125 | <br>3<br>3 | <br>3<br>3 | <br>3<br>3 | <br>3<br>3 | 3<br><br> | <br>3<br>3 | <br>3<br>3 | <br>3<br>3 | <br>3<br>3 | <br>3<br>1 |
| N-Bu-pyrimidine-$OP(OC_2H_5)_2$ (S), $N(CH_3)_2$ | 0.01<br>0.05<br>0.0125 | <br>3<br>3 | <br>3<br>3 | <br>3<br>3 | <br>3<br>0 | 3<br><br> | <br>3<br>3 | <br>3<br>3 | <br>3<br>3 | <br>3<br>3 | <br>3<br>3 |
| $CH_3$-pyrimidine-$OP(OC_2H_5)_2$ (S), piperidino | 0.01<br>0.05<br>0.0125 | <br>3<br>3 | <br>3<br>3 | <br>3<br>3 | <br>3<br>2 | 3<br><br> | <br>3<br>3 | <br>3<br>3 | <br>3<br>2 | <br>3<br>3 | <br>0<br>0 |
| $CH_3$-pyrimidine-$OP(OC_2H_5)_2$ (S), $N(CH_3)_2$ | 0.01<br>0.05<br>0.0125 | <br>3<br>3 | <br>3<br>3 | <br>3<br>3 | <br>3<br>3 | 3<br><br> | <br>3<br>3 | <br>3<br>3 | <br>3<br>3 | <br>3<br>3 | <br>3<br>3 |

4. O,O-diethyl-O-(5-n-butyl-2-dimethylamino-4-methylpyrimid-6-yl)phosphorothionate.

5. O,O-diethyl-O-(2-dimethylamino-4-methylpyrimid-6-yl)phosphorothionate, O,O-diethyl-O-(2-dimethylamino-4-methylpyrimid-6-yl)phosphate, O,O-diethyl-O-(4-n-butyl-2-dimethylaminopyrimid-6-yl)phosphorothionate and O,O-diethyl-O-(2-dimethylaminopyrimid-6-yl)phosphorothionate.

6. O,O-di-n-butyl-O-(2-dimethylamino-4-methylpyrimid-6-yl)phosphorothionate, O,O-diethyl-O-(2-di-n-butylamino-4-methylpyrimid-6-yl)phosphorothionate, O,O-diethyl-O-(4-methyl-2-piperidinopyrimid-6-yl)phosphorothionate and O,O-dimethyl-O-(5-allyl-2-dimethylamino-4-methylpyrimid-6-yl)phosphorothionate.

References Cited by the Examiner
UNITED STATES PATENTS

| | | | |
|---|---|---|---|
| 2,844,578 | 7/1958 | Acker | 260—256.5 |
| 3,064,000 | 11/1962 | Ito et al. | 260—256.5 |
| 3,130,123 | 4/1964 | Weiss et al. | 137—33 |
| 3,136,690 | 6/1964 | Beriger | 167—33 |
| 3,159,630 | 12/1964 | Rigterink | 260—256.4 |

ALEX MAZEL, *Primary Examiner.*

HENRY R. JILES, *Examiner.*

M. O'BRIEN, *Assistant Examiner.*